US009783081B2

(12) United States Patent
Saucier et al.

(10) Patent No.: US 9,783,081 B2
(45) Date of Patent: Oct. 10, 2017

(54) POWER TRANSFER SEAT

(71) Applicant: Ricon Corp., San Fernando, CA (US)

(72) Inventors: Stanton D. Saucier, Tarzana, CA (US); Lluno Cervera, Panorama City, CA (US)

(73) Assignee: Ricon Corp., San Fernando, CA (US)

( * ) Notice: Subject to any disclaimer, the term of this patent is extended or adjusted under 35 U.S.C. 154(b) by 0 days.

(21) Appl. No.: 14/899,250

(22) PCT Filed: Jun. 26, 2014

(86) PCT No.: PCT/US2014/044355
§ 371 (c)(1),
(2) Date: Dec. 17, 2015

(87) PCT Pub. No.: WO2014/210318
PCT Pub. Date: Dec. 31, 2014

(65) Prior Publication Data
US 2016/0144745 A1    May 26, 2016

Related U.S. Application Data

(60) Provisional application No. 61/839,635, filed on Jun. 26, 2013.

(51) Int. Cl.
*B60N 2/14* (2006.01)
*B60N 2/07* (2006.01)
(Continued)

(52) U.S. Cl.
CPC ......... *B60N 2/0296* (2013.01); *B60N 2/0228* (2013.01); *B60N 2/0232* (2013.01);
(Continued)

(58) Field of Classification Search
CPC . B60N 2/0296; B60N 2/14; B60N 2002/0256
(Continued)

(56) References Cited

U.S. PATENT DOCUMENTS 3,383,477 A * 5/1968 Swisher ............. G05G 9/04785
200/6 BB
4,865,377 A * 9/1989 Musser .................. B60N 2/045
248/503.1
(Continued)

OTHER PUBLICATIONS https://web.archive.org/same/ embed/http://www.riconcorp.com/pdfs/32dsb03/32/dsb03a.pdf, Ricon Operators Manual, Mar. 24, 2002, 4 pages.*
(Continued)

*Primary Examiner* — Dennis H Pedder
(74) *Attorney, Agent, or Firm* — The Webb Law Firm

(57) ABSTRACT

A power transfer seat base includes a top fixed plate having a fixed stop attached to an upper surface thereof, a rotating plate mounted on the top fixed plate, the rotating plate having a rotating stop attached to a bottom surface thereof, and a user control interface box mounting bracket mounted on the rotating plate. An operating control having a rotation control switch and a directional control switch disposed on a user control interface box body that is mounted on the mounting bracket. The rotating plate is configured so that the rotating stop and the mounting bracket may be connected to the rotating plate at different positions. The power transfer seat also includes a mounting system that is configured to be connected to the base at different locations in a fore/aft direction and at different locations in a lateral direction.

23 Claims, 9 Drawing Sheets

(51) Int. Cl.
  *B60N 2/02* (2006.01)
  *B60N 2/06* (2006.01)
  *B60N 2/24* (2006.01)
(52) U.S. Cl.
  CPC .............. *B60N 2/067* (2013.01); *B60N 2/14* (2013.01); *B60N 2/245* (2013.01); *B60N 2002/0256* (2013.01)
(58) Field of Classification Search
  USPC .......... 296/65.13–65.15, 65.06, 65, 7, 65.03; 297/344.21–344.24, 344.1; 248/503.1
  See application file for complete search history.

(56) References Cited

U.S. PATENT DOCUMENTS

| | | | | | |
|---|---|---|---|---|---|
| 4,955,575 | A | * | 9/1990 | Moore | B60N 2/10 248/398 |
| 5,125,711 | A | * | 6/1992 | Syed | B60N 2/01583 248/503.1 |
| 5,372,398 | A | * | 12/1994 | Aneiros | B60N 2/01591 248/430 |
| 5,498,051 | A | * | 3/1996 | Sponsler | B60N 2/01583 248/503.1 |
| 5,562,322 | A | * | 10/1996 | Christoffel | B60N 2/01583 248/503.1 |
| 6,056,346 | A | * | 5/2000 | Smuk | B60N 2/01591 248/429 |
| 6,286,886 | B1 | * | 9/2001 | Odagaki | B60N 2/01583 296/65.03 |
| 6,843,526 | B2 | * | 1/2005 | Honda | B60N 2/3011 296/65.03 |
| RE38,845 | E | * | 10/2005 | Odagaki | B60N 2/01583 296/65.03 |
| 7,121,608 | B2 | * | 10/2006 | Billger | B60N 2/002 180/329 |
| 8,628,135 | B2 | * | 1/2014 | Valasin | B60N 2/01583 248/503.1 |
| 2001/0038223 | A1 | | 11/2001 | Suga et al. | |
| 2005/0264020 | A1 | | 12/2005 | Egan | |
| 2006/0243566 | A1 | | 11/2006 | Sakai | |
| 2008/0111364 | A1 | | 5/2008 | Ninio et al. | |

OTHER PUBLICATIONS

Ricon Corporation, R1209 Six-Way Power Seat Base, Service Manual, Jun. 17, 2011, pp. 1-27.
"R1208 Six-Way Power Seat Base" Service Manual, Mar. 25, 2002, 32DSB02.A, 29 pgs., Ricon Corporation, United States of America.

* cited by examiner ial Application No. PCT/US2014/044355 filed
POWER TRANSFER SEAT

CROSS REFERENCE TO RELATED APPLICATION

This application is the United States national phase of International Application No. PCT/US2014/044355 filed Jun. 26, 2014, and claims priority from U.S. Provisional Patent Application No. 61/839,635, filed on Jun. 26, 2013, the disclosures of which are incorporated herein by reference in their entirety.

BACKGROUND OF THE INVENTION

Field of the Invention

The present invention relates to a six way power transfer seat used by persons confined to wheelchairs for transferring from a wheelchair to a vehicle driver or front passenger seat and operating controls for such a power transfer seat.

Description of Related Art

Six way power transfer seats provide three movements for a person confined to a wheelchair to transfer from the wheelchair to a vehicle driver or passenger seat and subsequently to a forward position within the vehicle suitable for driving. In particular, such seats are capable of moving forward and rearward in the vehicle fore/aft direction, upward and downward, and rotationally about a vertical axis. The displacement of the transfer seat is typically two to three times that available in an OEM operated seat base. A four way power transfer seat is also common and is produced by forgoing either the raise and lower function or the swivel function of the six way power transfer seat, thereby creating a system that can be made available for less cost in applications where all three ranges of motion are not required.

Since their introduction in the early 1980's, nearly all transfer seats have been operated with a user control interface consisting of toggle switches; two switches for a four way power transfer seat and three switches for a six way power transfer seat. Early control designs featured two or three toggle switches arranged in a row atop a small box located approximately at the hip on the inboard side of the bucket seat. Without looking at the layout of the switches of such an arrangement, it was difficult to select the proper switch for the function desired. An improvement to the early design was to change the shape of the box so that the switches could be more directionally oriented.

Whether arranged in a straight line on a small box or directionally oriented, another concern of the operator is the inadvertent operation of a seat movement function while the vehicle is underway. Accordingly, further improvement involved the addition of a guard to minimize the potential for inadvertent operation. Such guards also serve to protect the switches during the transfer process but do not limit the movement of the switch.

Additionally, different vehicles employ different seat mounting systems. The current approach for mounting a power transfer seat within a vehicle requires that a different seat base (i.e., a separate SKU) be provided to accommodate every different vehicle.

SUMMARY OF THE INVENTION

Accordingly, there is a, general need in the art for a power transfer seat having operating controls that are intuitively identified and operated, and are also arranged and configured to prevent inadvertent actuation or overloading of the switch. There is also a general need in the art for a power transfer seat that is configurable for right and left hand installation, and that provides a seat base that may be configured for installation in a variety of different vehicles.

According to one preferred and non-limiting embodiment, a power transfer seat operating control is provided that includes tactilely intuitive controls that save time and eliminate user frustration; switch protective elements that protect the various switches in the operating control from damage while the operator transfers to/from the wheelchair to/from the vehicle seat; and a Controller Area Network (CAN) based vehicle interlock that enhances operator safety by disabling the transfer seat controls when the vehicle transmission is not in PARK.

According to another preferred and non-limiting embodiment, a configurable assembly and mounting system is provided that enables the same base unit to be installed in a variety of different vehicle applications. In particular, an improved seat base is fitted with a configurable system of hooks and forks that enable a single base configuration to be used with a range of different vehicle specific application kits in order to facilitate application to a wide range of vehicles. The system is also configurable to provide the ability to assemble the same set of components for use in either the driver's or passenger's side application. The system enables the equipment dealer to stock less material that is applicable to a wider range of vehicles than competitive systems.

In accordance with one preferred and non-limiting embodiment of the present invention, a power transfer seat base is provided. The power transfer seat base includes a top fixed plate, the top fixed plate having at least one fixed stop attached to an upper surface of the top fixed plate, a rotating plate mounted on the top fixed plate, the rotating plate having at least one rotating stop attached to a bottom surface of the rotating plate, and a user control interface box mounting bracket mounted on the rotating plate. The rotating plate is rotatably mounted to the top fixed plate and configured so that the at least one rotating stop and the user control interface box mounting bracket may be connected to the rotating plate at different positions.

The at least one fixed stop attached to the upper surface of the top fixed plate may include at least two fixed stops attached to opposing sides of the upper surface of the top fixed plate. The at least one fixed stop attached to the upper surface of the top fixed plate is configured to engage the at least one rotating stop attached to the bottom surface of the rotating plate to stop rotation of the rotating plate with respect to the top fixed plate in a direction of rotation. The at least one rotating stop and the user control interface box mounting bracket may be connected to the rotating plate on different sides of the rotating plate.

The power transfer seat base may also include an operating control. The operating control includes a user control interface box body, at least one rotation control switch disposed on a first portion of the user control interface box body, the at least one rotation control switch configured to be actuated to control rotational movement of the power transfer seat about a vertical axis, and a directional control switch disposed on a second portion of the user control interface box body, the directional control switch configured to be actuated to control forward and rearward movement of the transfer seat base and upward and downward movement of the power transfer seat. The user control interface box body is configurable for both driver and passenger side applications. The operating control may be mounted on the user control interface box mounting bracket. The first portion of the user control interface box body may include a forward half of the user control interface box body and the second portion of the user control interface box body may include a rearward half of the user control interface box body.

The power transfer seat base may further include a mounting system for the power transfer seat base. The mounting system includes at least one removable cross member, the at least one removable cross member being configured to be attached to the power transfer seat base at different locations in a fore/aft direction, and at least one movable hook, the at least one movable hook configured to be attached to the power transfer seat base and the at least one removable cross member at different locations in a lateral direction. The at least one removable cross member may include at least two removable cross members. The mounting system may further include at least two attachment brackets disposed on the power transfer seat base. Each of the at least two attachment brackets may be connected to a respective one of the at least two removable cross members. Each of the at least two attachment brackets includes a plurality of adjustment holes defined therein and spaced apart in the fore/aft direction. Each of the at least two attachment brackets may be connected to the respective one of the at least two removable cross members by at least one fastener engaging the respective one of the at least two removable cross members and at least one of the plurality of adjustment holes of the attachment bracket.

The at least one movable hook may include at least two movable hooks. The at least one removable cross member may include at least two sets of adjustment holes defined therein at opposite ends of the at least one removable cross member. The adjustment holes of each set are spaced apart in the lateral direction. Each of the at least two movable hooks may be connected to the at least one removable cross member by at least one fastener engaging the movable hook and at least one of the adjustment holes of the set of adjustment holes in the respective end of the at least one removable cross member. The mounting assembly may further include at least one movable fork configured to be attached to a rear of the power transfer seat base at different locations in the lateral direction.

In accordance with another preferred and non-limiting embodiment of the present invention, an operating control for a power transfer seat is provided. The operating control includes a user control interface box body, at least one rotation control switch disposed on a first portion of the user control interface box body, the at least one rotation control switch configured to be actuated to control rotational movement of the power transfer seat about a vertical axis, and a directional control switch disposed on a second portion of the user control interface box body, the directional control switch configured to be actuated to control forward and rearward movement of the transfer seat base and upward and downward movement of the power transfer seat. The first portion of the user control interface box body may include a forward half of the user control interface box body and the second portion of the user control interface box body may include a rearward half of the user control interface box body. The user control interface box body may be configurable for both driver and passenger side applications. The forward half and the rearward half of the user control interface box body may be shaped differently to provide tactile feedback to a user when actuating the at least one rotation control switch or the directional control switch.

The at least one rotation control switch may include a knob attached to a top side of the user control interface box body, the knob being rotatable about a vertical axis. The user control interface box body may further include protrusions extending parallel to the vertical axis of the at least one rotation control switch to limit travel of the rotation control switch.

The directional control switch may include a joystick switch having a lever extending laterally from the user control interface box body, the lever being movable along a vertical direction and a horizontal fore/aft direction. The lever of the joystick switch may be spring loaded. The user control interface box body may further include a protective housing for the lever of the joystick switch, the protective housing being configured to limit displacement of the lever of the joystick switch and protect the at least one rotation control switch from being damaged or inadvertently operated during a transfer event.

The operating control may further include a microcontroller in communication with the at least one rotation control switch and the directional control switch and with a controller area network of a vehicle, the microcontroller being configured to monitor the controller area network to detect the presence of a PARK signal transmitted over the controller area network and to disable operation of the operating control based on actuation of the at least one rotation control switch or the directional control switch when the PARK signal is not present.

The at least one rotation control switch may include two push button switches, each push button switch being configured to be actuated to control movement of the power transfer seat in one direction of rotation about the vertical axis. The directional control switch may include a D-pad switch.

In accordance with another preferred and non-limiting embodiment of the present invention, a mounting system for a power transfer seat base is provided. The mounting system includes at least one removable cross member, the at least one removable cross member being configured to be attached to the power transfer seat base at different locations in a fore/aft direction, and at least one movable hook, the at least one movable hook configured to be attached to the power transfer seat base and the at least one removable cross member at different locations in a lateral direction. The at least one removable cross member may include at least two removable cross members. The mounting system may further include at least two attachment brackets disposed on the power transfer seat base. Each of the at least two attachment brackets may be connected to a respective one of the at least two removable cross members. Each of the at least two attachment brackets includes a plurality of adjustment holes defined therein and spaced apart in the fore/aft direction. Each of the at least two attachment brackets may be connected to the respective one of the at least two removable cross members by at least one fastener engaging the respective one of the at least two removable cross members and at least one of the plurality of adjustment holes of the attachment bracket.

The at least one movable hook may include at least two movable hooks. The at least one removable cross member may include at least two sets of adjustment holes defined therein at opposite ends of the at least one removable cross member. The adjustment holes of each set are spaced apart in the lateral direction. Each of the at least two removable hooks may be connected to the at least one removable cross member by at least one fastener engaging the movable hook and at least one of the adjustment holes of the set of adjustment holes in the respective end of the at least one removable cross member. The mounting assembly may further include at least one movable fork configured to be attached to a rear of the power transfer seat base at different locations in the lateral direction. The mounting system may include a vehicle specific installation kit.

In accordance with another preferred and non-limiting embodiment of the present invention, a method of assembling a power transfer seat base is provided. The method includes providing a power transfer seat base that includes a top fixed plate, at least one fixed stop connected to an upper surface of the top fixed plate, a rotating plate, at least one rotating stop configured to be attached to a bottom surface of the rotating plate, a user control interface box mounting bracket configured to be mounted on the rotating plate, and a mounting system for the power transfer seat base, the mounting system including at least one removable cross member and at least one movable hook. The method further includes selecting one of a right side configuration and a left side configuration for the power transfer seat base, attaching the at least one rotating stop to a side of the bottom surface of the rotating plate based on the selection of one of the right side configuration and the left side configuration, mounting the user control interface box mounting bracket on a side of the rotating plate based on the selection of one of the right side configuration and the left side configuration, rotatably mounting the rotating plate to the top fixed plate, selecting a position of the power transfer seat base and the at least one removable cross member with respect to the at least one movable hook in a lateral direction, attaching the at least one movable hook to the power transfer seat base and the at least one removable cross member based on the selected position in the lateral direction, selecting a position of the power transfer seat base with respect to the at least one removable cross member in a fore/aft direction, and attaching the at least one movable cross member to the power transfer seat base based on the selected position in the fore/aft direction.

These and other features and characteristics of the present invention, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
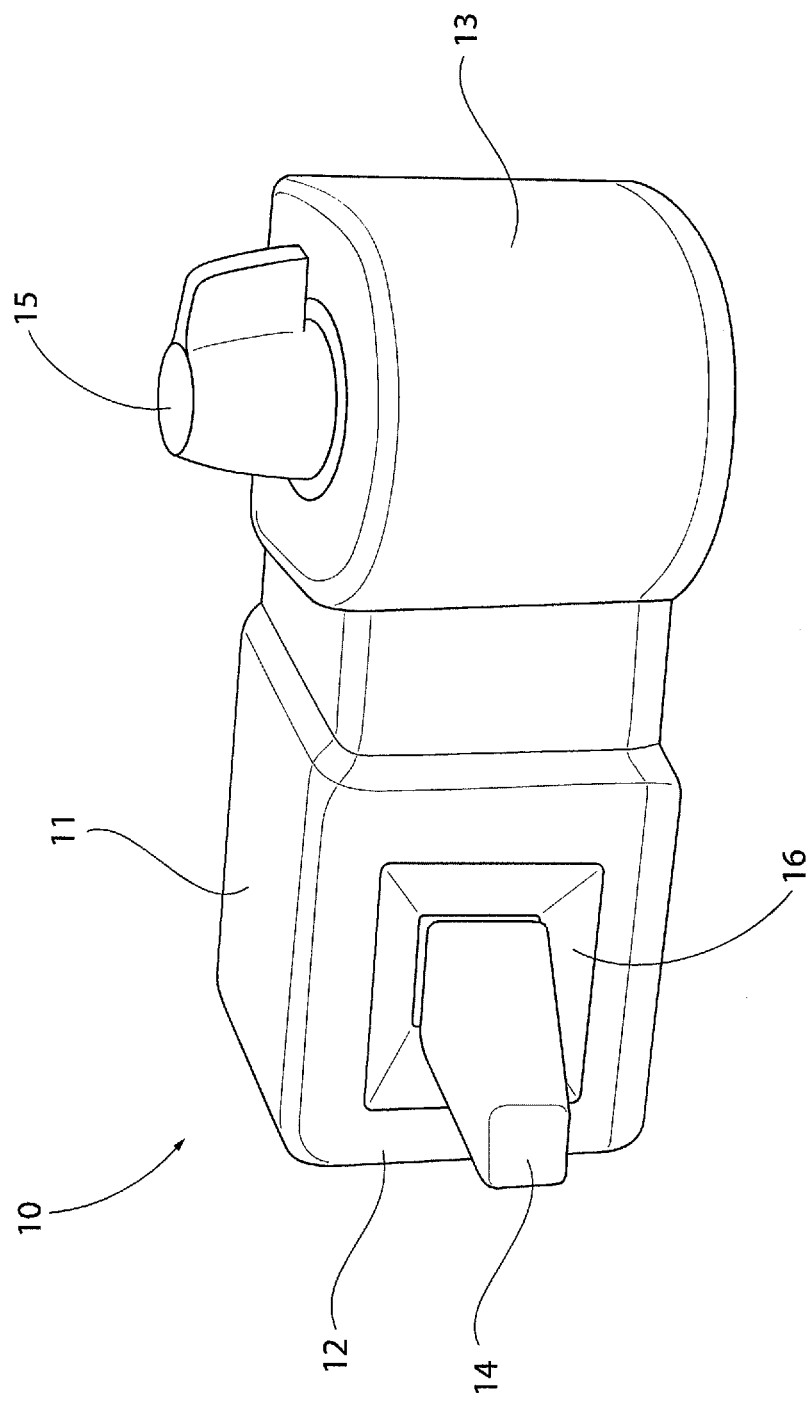
FIG. 1 depicts a perspective view of an operating control for a six way power transfer seat in accordance with an embodiment of the present invention.

For purposes of the description hereinafter, the terms "end", "upper", "lower", "right", "left", "vertical", "horizontal", "top", "bottom", "lateral", "longitudinal", "fore/aft", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
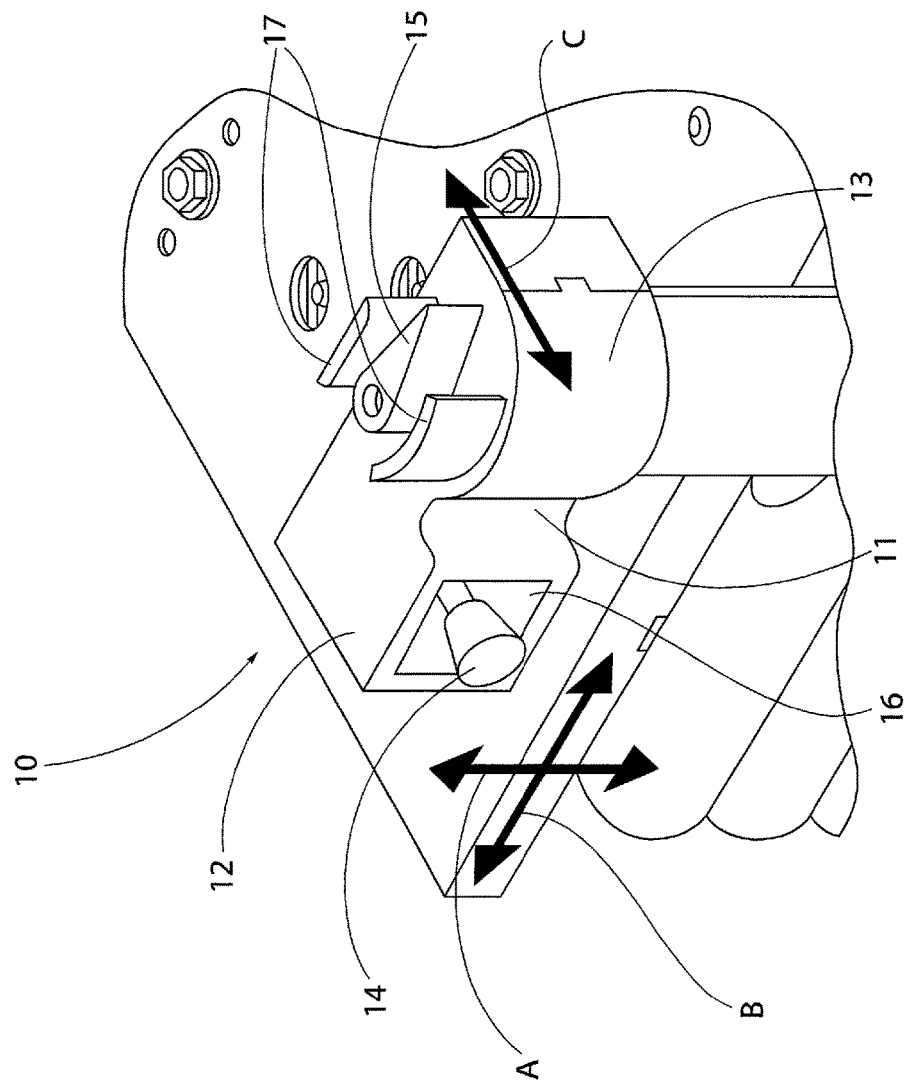
FIG. 2 depicts a schematic view demonstrating the actuation and protective elements of the operating control of FIG. 1.

With reference to FIGS. 1 and 2, an operating control for a six way power transfer seat is shown in accordance with an embodiment of the present invention. The operating control includes a user control interface box 10 having a user control interface box body 11, which provides a user interface for controlling movement of the power transfer seat. The user control interface box body 11 is divided into a first portion including the forward half 13 of the body 11 and a second portion including the rearward half 12 of the body 11. The rearward half 12 of the user control interface box body 11 includes a directional control switch 14. As shown, the directional control switch 14 includes a joystick switch having a lever located on the side of the user control interface box body 11 and extending laterally from the user control interface box body 11. The lever is movable along a vertical direction as indicated by the arrow A shown in FIG. 2 and a horizontal fore/aft direction as indicated by the arrow B shown in FIG. 2. The joystick switch 14 is actuated to control both the forward and rearward movement and the upward and downward movement functions of the power transfer seat. Moving the lever of the joystick switch 14 forward makes the base of the seat move forward, moving the lever up makes the base go up, and so on. The forward half 13 of the user control interface box body 11 includes at least one rotation control switch 15, which includes a knob attached to a top side of the user control interface box body 11 and rotatable about a vertical axis as indicated by the arrow C shown in FIG. 2. The at least one rotation control switch 15 is actuated to control rotational movement of the power transfer seat about a vertical axis. Rotating the knob of the at least one rotation control switch 15 clockwise makes the seat rotate clockwise and vice versa. In another preferred and non-limiting embodiment, the joystick switch 14 is located on a first portion of the user control interface box body 11, and the at least one rotation control switch 15 is located on a second, different portion of the user control interface box body 11. Further, the joystick switch 14 and/or the rotation control switch 15 can be configured to be actuated to control any specified movement of the power transfer seat, including, but not limited to, forward movement, rearward movement, upward movement, downward movement, rotation movement about a vertical axis, rotation movement about a horizontal axis, and/or any other desired movement of the power transfer seat.

In one preferred and non-limiting embodiment, the shapes of the rearward and forward halves 12, 13 (or different portions) of the user control interface box body 11 are shaped differently in order to provide the user with further tactile information when the user reaches for the joystick and rotation control switches 14, 15. The combination of the laterally oriented joystick switch 14 and the rotation control switch 15 makes an arrangement that is more tactilely intuitive than previous iterations. Moreover, as the joystick switch 14 controls both forward and rearward and upward and downward movement, the number of choices that the user has to make in engaging a switch has been limited, thereby making it nearly impossible for the user to pick the wrong switch.

Because the user interface provided by the operating control is simpler to operate, it may also be more susceptible to inadvertent operation. In order to mitigate this eventuality, and in one preferred and non-limiting embodiment, one or more protective elements are also provided on the user control interface box body 11 to prevent or limit inadvertent operation. As shown in FIG. 2, at least one, and preferably multiple (e.g., two) protrusions 17 are mounted parallel to the axis of the knob of the at least one rotation control switch 15 that serve the dual purpose of limiting the travel of the rotation control switch 15, thereby preventing the overloading of the switch by the operator, and protecting the rotation control switch 15 from damage while the operator is moving from the wheelchair to the vehicle driver's seat. Further, such protrusions 17 may be shaped or contoured to be comfortably contacted or gripped by the user, while still providing access to the rotation control switch 15. In addition, protrusions or other protective elements may be located on or near the joystick switch 14 to provide similar protection.

In another preferred and non-limiting embodiment, the lever or bat of the joystick switch 14 is spring loaded such that, in the event a blow is taken by the joystick switch 14 along the axis of the lever, the joystick switch 14 can compress into a protective housing 16 formed in the rearward half 12 of the user control interface box body 11. Additionally, the surrounding protective housing 16 of the joystick switch 14 is spaced such that, in the event the joystick switch 14 is displaced in any direction, it can only move just past the actuation point of the joystick switch 14 before contact is made between the lever of the joystick switch 14 and the protective housing 16, thereby protecting the joystick switch 14 from damage when the operator is moving from the wheelchair to the vehicle driver's seat.

Figure 1A:
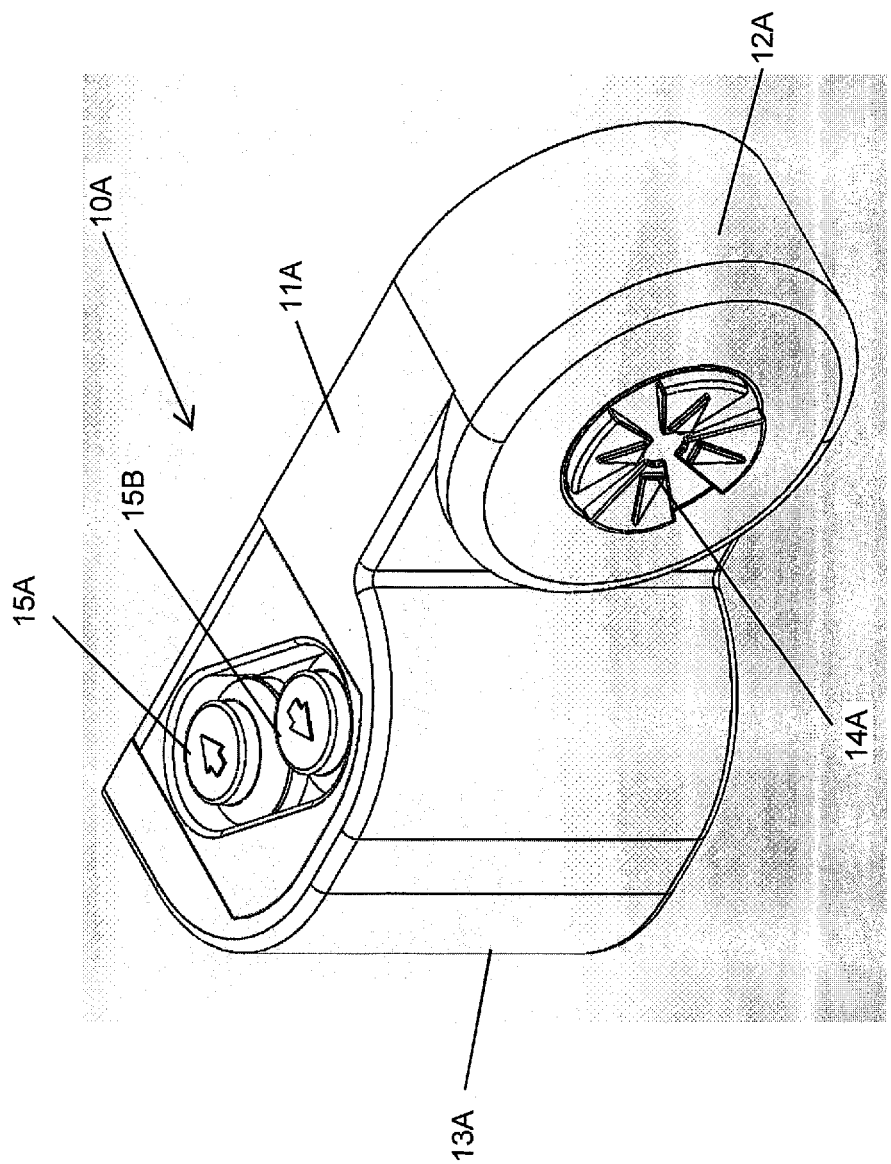
FIG. 1A depicts a perspective view of an operating control for a six way power transfer seat in accordance with another embodiment of the present invention.

With reference to FIG. 1A, an operating control for a six way power transfer seat is shown in accordance with another embodiment of the present invention. The operating control illustrated in FIG. 1A operates according to the same principles as the operating control described above with reference to FIGS. 1 and 2, but provides a different configuration of controls. In particular, the operating control includes a user control interface box 10A having a user control interface box body 11A, which provides a user interface for controlling movement of a power transfer seat. The user control interface box body 11A is divided into a first portion including the forward half 13A of the body 11A and a second portion including the rearward half 12A of the body 11A. The rearward half 12A of the user control interface box body 11A includes a directional control switch 14A in the form of a D-pad switch. As shown, the D-pad switch 14A includes a segmented button or, alternatively, multiple buttons, which is/are arranged so that pressing on/actuation of a particular portion of the button or on an individual button controls the power transfer seat to move in a direction corresponding to the position of the portion of the button or individual button being pressed/actuated. Accordingly, pressing or actuating the upper portion of the D-pad switch 14A causes the power transfer seat to move upward, pressing or actuating the lower portion of the D-pad switch 14A causes the power transfer seat to move downward, pressing or actuating the forward portion of the D-pad switch 14A causes the power transfer seat to move forward, and pressing or actuating the rearward portion of the D-pad switch 14A causes the power transfer seat to move rearward. In this manner, the D-pad switch 14A is actuated to control both the forward and rearward movement and the upward and downward movement functions of the power transfer seat. The forward half 13A of the user control interface box body 11A includes at least one rotation control switch, which includes two push button switches 15A, 15B. Each push button switch 15A, 15B is configured to be actuated to control movement of the power transfer seat in one direction of rotation about the vertical axis. Pressing or actuating the push button switch 15A with the right pointing arrow causes the power transfer seat to rotate clockwise about the vertical axis, and pressing or actuating the push button switch 15B with the left pointing arrow causes the power transfer seat to rotate counterclockwise about the vertical axis. It is to be appreciated that the D-pad switch 14A and/or the push button rotation control switches 15A, 15B can be configured to be actuated to control any specified movement of the power transfer seat, including, but not limited to, forward movement, rearward movement, upward movement, downward movement, rotation movement about a vertical axis, rotation movement about a horizontal axis, and/or any other desired movement of the power transfer seat. As in the embodiment of the operating control discussed above with reference to FIGS. 1 and 2, the rearward and forward halves 12A, 13A of the user control interface box body 11A may be shaped differently to provide the user with further tactile information when the user reaches to press the D-pad switch 14A and/or the push button rotation control switches 15A, 15B. It is to be appreciated that the user control interface box body 11A may include one or more protective elements provided to protect the D-pad switch 14A and the push button rotation control switches 15A, 15B from inadvertent operation and damage. For instance, as shown in FIG. 1A, the push button rotation control switches 15A, 15B are recessed within the user control interface box body 11A.

It is to be appreciated with respect to both of the embodiment of FIGS. 1 and 2, and the embodiment of FIG. 1A, that the user control interface box body 11, 11A is configurable for both driver and passenger side applications. In other words, the at least one rotation control switch 15, 15A, 15B may be moved from one side of the user control interface box body 11, 11A to the other and the jumpers of the directional control switch 14, 14A may be swapped so that the user control interface box 10, 10A may be positioned on either one of the left side or the right side of the power transfer seat base.

Figure 3:
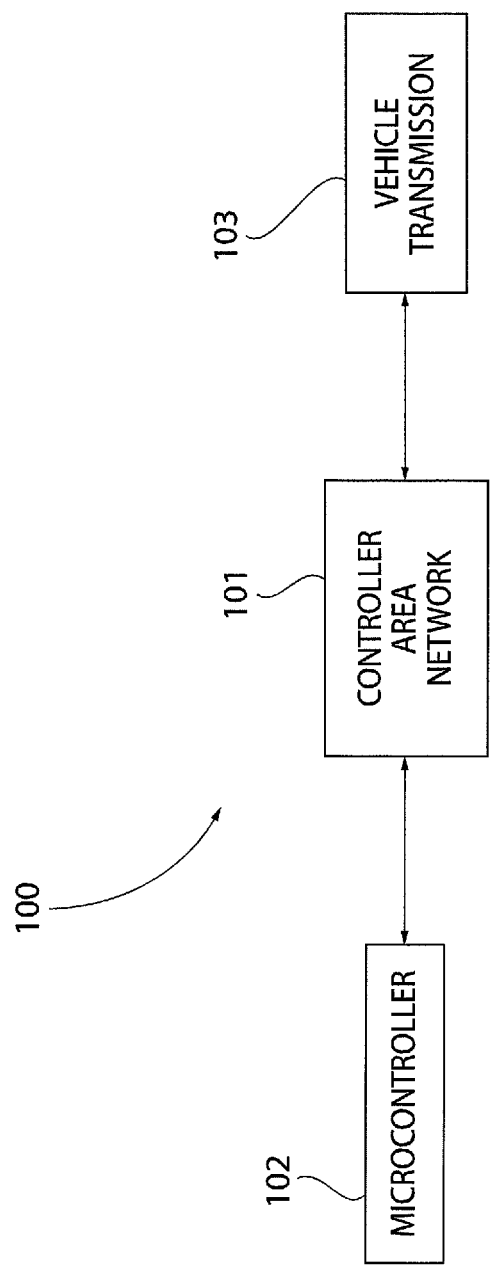
FIG. 3 depicts a schematic of a CAN-based vehicle interlock system in accordance with another embodiment of the present invention.
Figure 4:
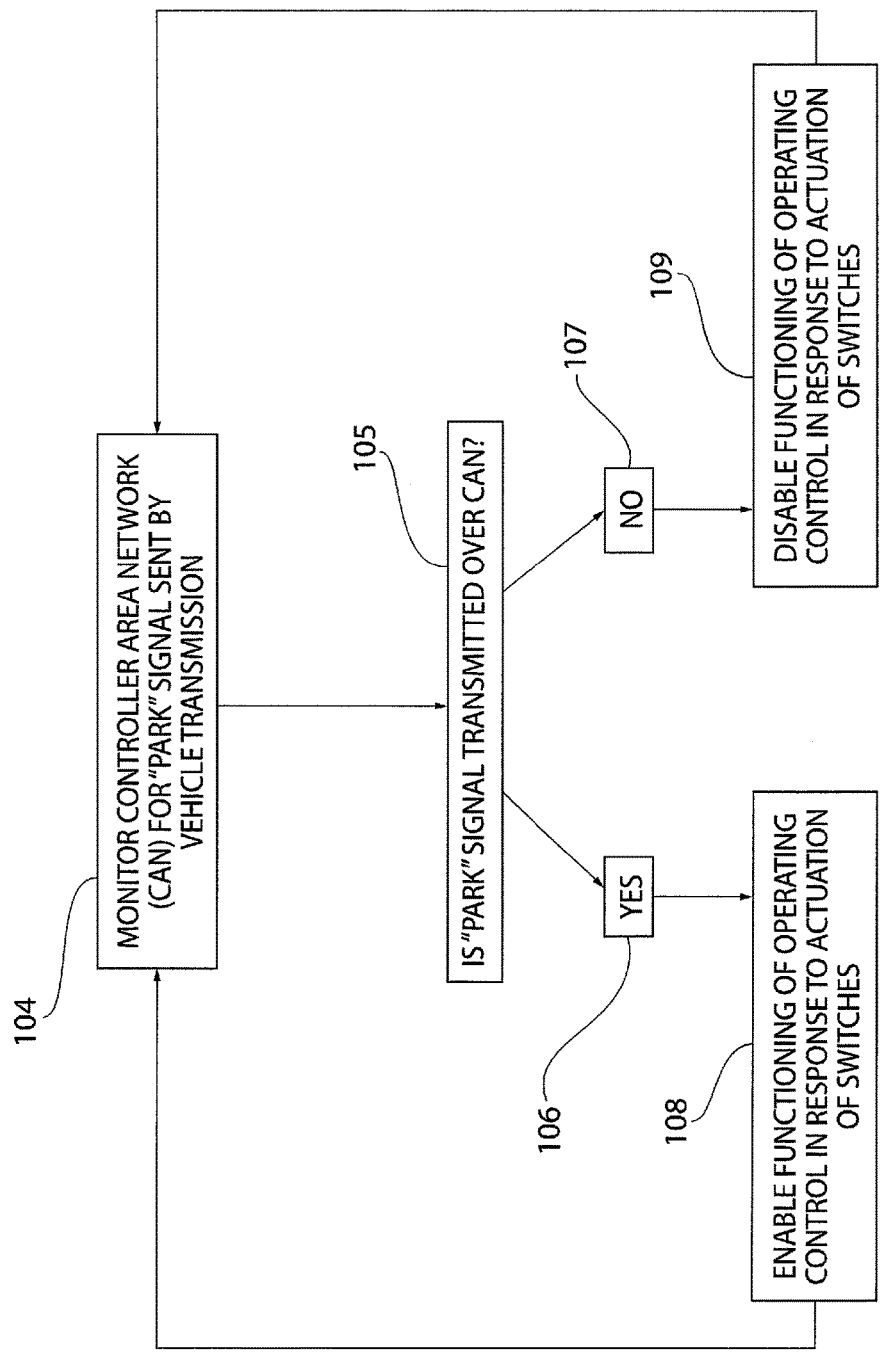
FIG. 4 depicts a schematic of an interlock process performed by the CAN-based vehicle interlock system of FIG. 3.

With reference to FIGS. 3 and 4, according to an additional preferred and non-limiting embodiment of the present invention, the operating control may be provided with a CAN-based vehicle interlock system 100 that disables the operating control when the vehicle is in motion. Modern automotive control systems are based on a series of vehicle mounted computer systems. These computers communicate with each other over a network referred to as a Controller Area Network (CAN) 101. CAN is a vehicle communications bus standard designed to allow microcontrollers and devices to communicate with each other within a vehicle without a host computer. CAN bus is a message-based protocol, designed specifically for automotive applications.

As described above, it is desirable for the operating control of the power transfer seat to be interlocked with the vehicle so that the transfer seat controls are disabled when the vehicle is not parked. To accomplish the vehicle interlock, and in one preferred and non-limiting embodiment, the operating control is provided with a microcontroller 102 capable of monitoring signals moving across the vehicle CAN 101, which are transmitted over the CAN by a vehicle transmission 103 or any other component of the CAN 101. By monitoring the CAN 101 for the absence of the vehicle's "PARK" signal, the microcontroller 102 provides a signal to the operating control that disables the transfer seat controls. In particular, the microcontroller 102 is in communication with the at least one rotation control switch 15 and the directional control switch 14 of the operating control. The microcontroller 102 monitors the CAN 101 to detect the presence of a "PARK" signal transmitted over the CAN 101 by the vehicle transmission 103 or other vehicle component in communication with the CAN 101. When the "PARK" signal is not present over the CAN 101, the microcontroller 102 disables operation of the operating control based on actuation of the at least one rotation control switch 15 or the directional control switch 14.

FIG. 4 illustrates a schematic of the interlock process performed by the CAN-based interlock system 100, particularly the microcontroller 102, to engage or disengage the interlock to disable or enable operating of the operating control, in accordance with another preferred and non-limiting embodiment of the present invention. In an initial step 104, the microcontroller 102 monitors the CAN 101 for the presence of the "PARK" signal sent by the vehicle transmission 103. In a following step 105, the microcontroller 102 determines whether the "PARK" signal is transmitted over the CAN 101. If the microcontroller 102 determines that the "PARK" signal is transmitted over the CAN 101, as indicated by step 106, the microcontroller 102 proceeds to step 108 to enable functioning of the operating control in response to actuation of the at least one rotation control switch 15 and/or the directional control switch 14. The process then returns to the initial monitoring step 104. If the microcontroller 102 determines that the "PARK" signal is not transmitted over the CAN 101, as indicated by step 107, the microcontroller 102 proceeds to step 109 to disable functioning of the operating control in response to actuation of the at least one rotation control switch 15 and/or the directional control switch 14. The process then returns to the initial monitoring step 104. It is to be appreciated that the process detailed in FIG. 4 is exemplary only. The CAN-based interlock system 100 may be configured and programmed in any manner known to be suitable to those having ordinary skill in the art to provide interlock capability to the operating control.

With reference to FIGS. 5-8, a configurable power transfer seat base 20 is shown in accordance with another preferred and non-limiting embodiment of the present invention. Given that it may be desired to install the seat base 20 in either the driver's or front passenger's positions, the power transfer seat base 20 is designed to permit the rotate function and the mounting of the user control interface box body 11 to be field-configurable. Most commonly, the transfer seat base 20 will be installed in the driver's position (on the left-hand side of the vehicle) and will be configured to rotate clockwise (as oriented from above the seat looking down) away from the driver's position and back again. In the event the seat is to be moved to the passenger side (on the right-hand side of the vehicle), the power transfer seat base 20 must be reconfigured to rotate in the opposite direction.

Figure 5:
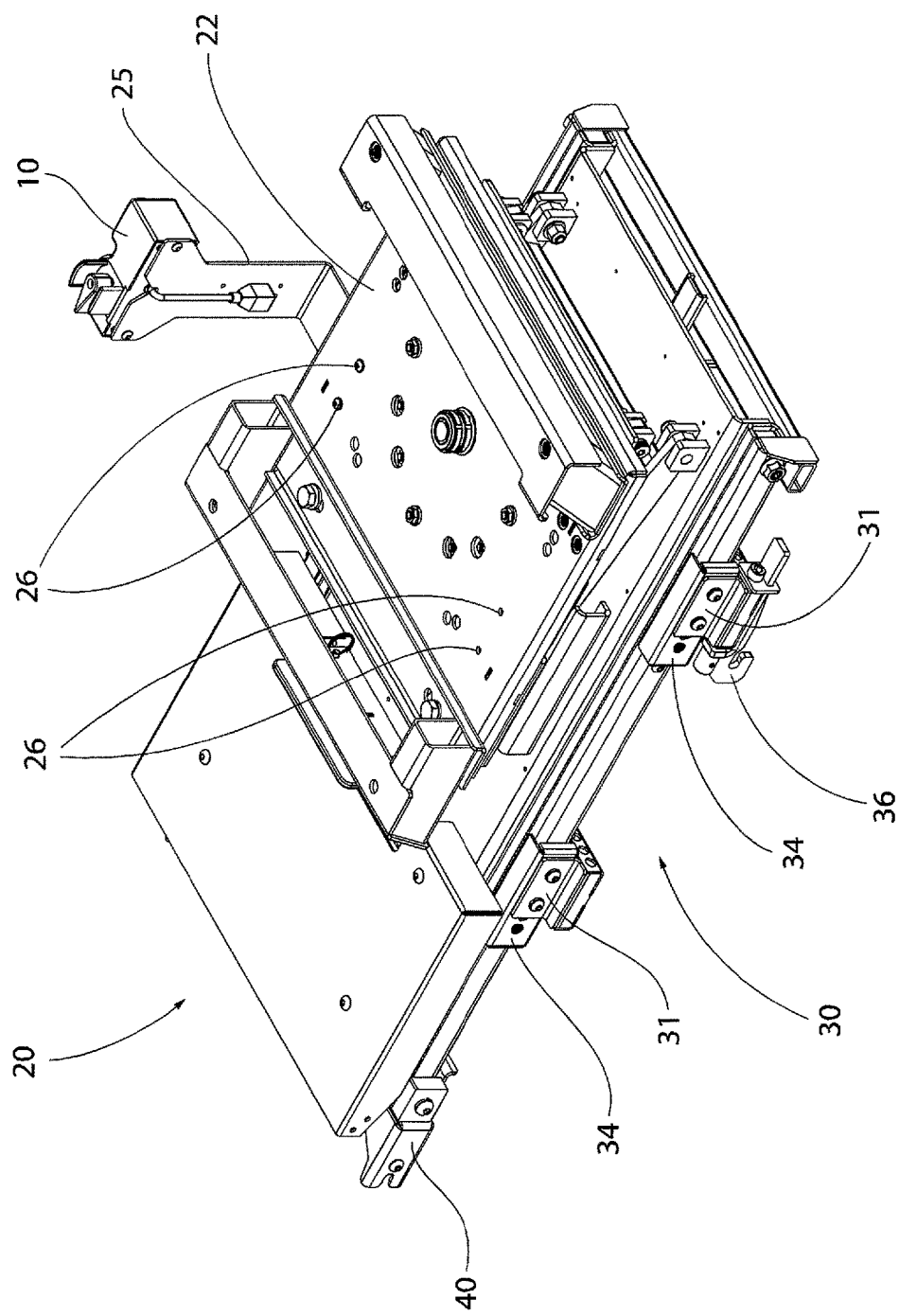
FIG. 5 depicts a perspective view of a power transfer seat base for a six way power transfer seat in accordance with another embodiment of the present invention.
Figure 6:
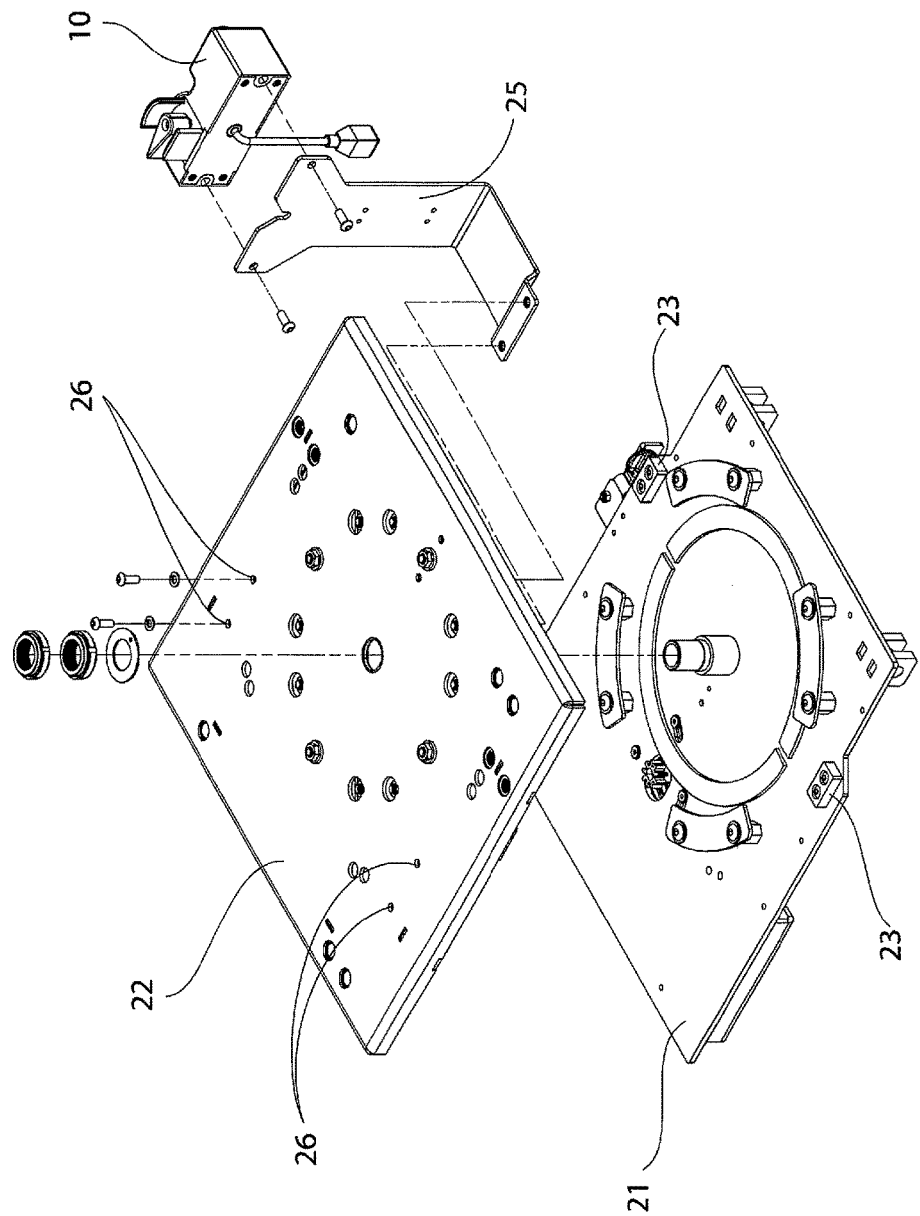
FIG. 6 depicts an exploded perspective view of a portion of the power transfer seat base of FIG. 5.
Figure 7:
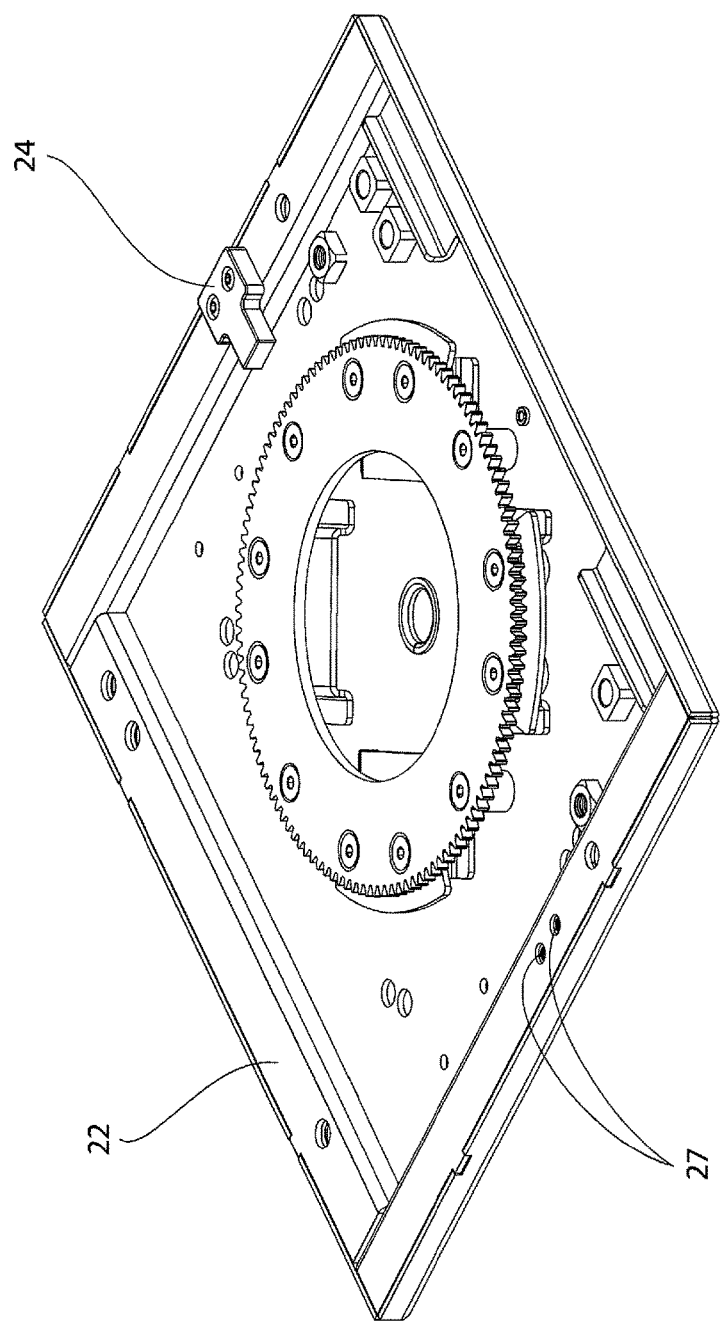
FIG. 7 depicts a perspective view of a bottom surface of a rotating plate of the power transfer seat base of FIG. 5.

As shown in FIGS. 5-7, the power transfer seat base 20 includes, amongst other components, a top fixed plate 21, a rotating plate 22 rotatably mounted above the top fixed plate 21, and a user control interface box mounting bracket 25 for mounting the user control interface box 10 to the power transfer seat base 20. The rotating plate 22 is configured so that the user control interface box mounting bracket 25 and at least one rotating stop 24 may be connected to the rotating plate 22 at different positions. The rotating plate 22 is provided with mounting holes 26 on both lateral sides thereof for attachment of the mounting bracket 25, and, thus, the user control interface box 10 mounted on the user control interface box mounting bracket 25, to the rotating plate 22. At least one, and preferably multiple (e.g., two) fixed stops 23 are mechanically attached on an upper surface of the top fixed plate 21 and the at least one rotating stop 24 is fastened to a bottom surface of the rotating plate 22 where the rotating plate 22 engages the top fixed plate 21. The rotating plate 22 is provided with mounting holes 27 formed on opposing lateral sides of the bottom surface thereof for attachment of the at least one rotating stop 24 to the rotating plate 22. The fixed stops 23 on the top fixed plate 21 are configured to engage the at least one rotating stop 24 on the rotating plate 22 to stop rotation of the rotating plate 22 with respect to the top fixed plate 21 in a given direction of rotation. Accordingly, providing two fixed stops 23 on the upper surface of the top fixed plate 21, as shown in FIG. 6, and one rotating stop 27 on the bottom surface of the rotating plate 22, as shown in FIG. 7, limits rotational movement of the rotating plate 22, and, thus, the power transfer seat, between a position wherein the power transfer seat faces in the forward direction of the vehicle and a position wherein the power transfer seat is oriented laterally to allow for entry and exit of the vehicle.

The power transfer seat base 20 is reconfigured to change the direction of rotation by moving the rotating stop 24 from one lateral side of the rotating plate 22 to the other, as shown in FIG. 7; moving the user control interface box mounting bracket 25 from one lateral side of the rotating plate 22 to the other side; and moving the user control interface box 10 by inverting the rotation control switch 15 and changing a jumper on the joystick switch 14 to maintain the correct orientation of the raise/lower function. Of course, it is envisioned that the fixed stops 23 and/or the rotating stops 24 may be positioned to allow the seat to be moved to any desirable position within or in connection with the vehicle. In addition, the mounting bracket 25 may be configured for use in a variety of applications and to suit any particular user. As such, the mounting bracket 25 may be adjustable, rotatable, removably detachable, or any other configuration to allow for the adjustment and/or movement of the mounting bracket 25 and/or the user control interface box 10.

Figure 8:
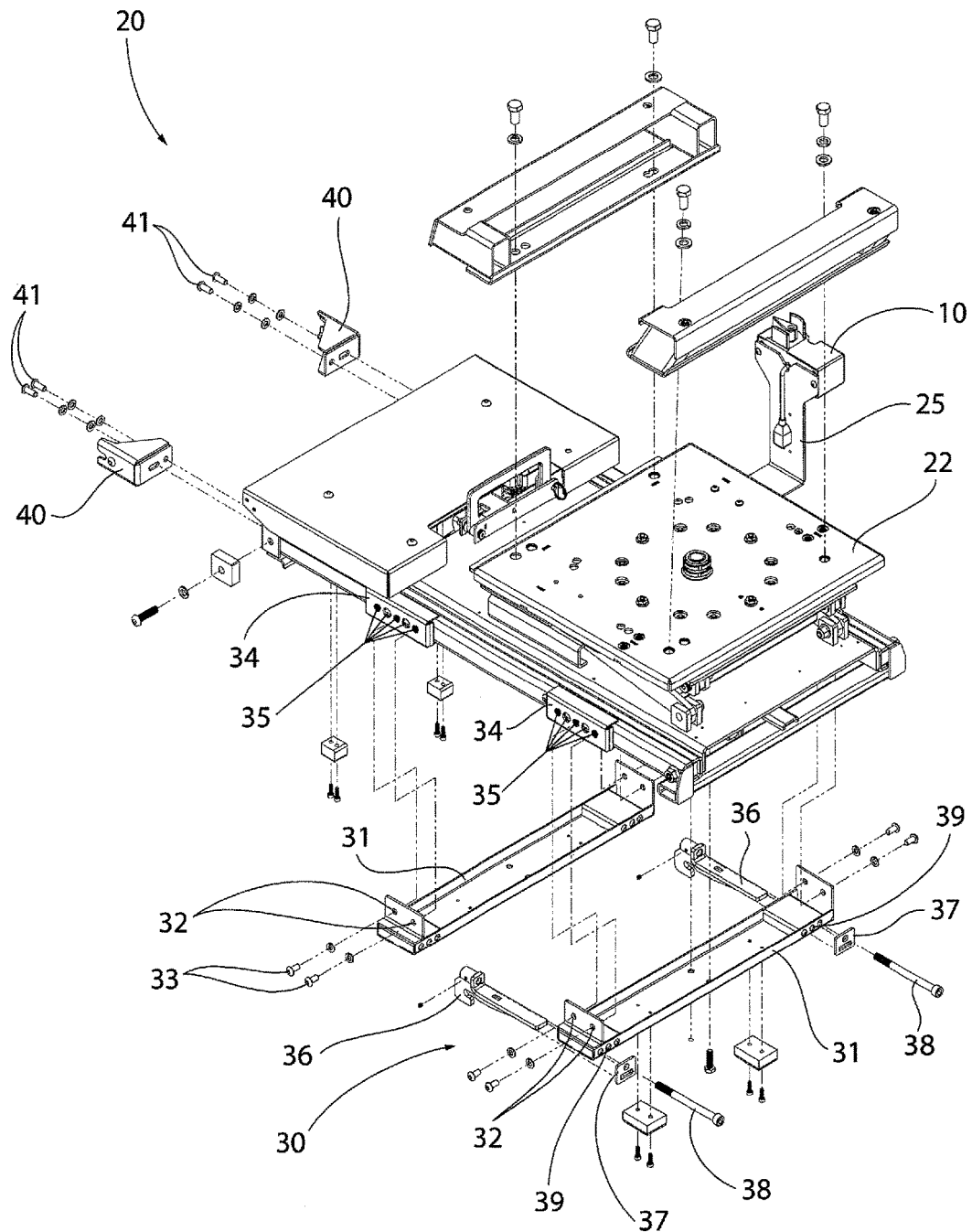
FIG. 8 depicts an exploded perspective view of the power transfer seat base of FIG. 5.

As shown in FIGS. 5 and 8, the power transfer seat base 20 also includes a mounting system 30 for the power transfer seat base 20, which is shown in accordance with yet another preferred and non-limiting embodiment of the present invention. The mounting system 30 is configurable so that the power transfer seat base 20 may be installed in a variety of vehicles. In particular, the mounting system 30 includes at least one, and preferably multiple (e.g., two) removable cross members 31 that accommodate variation in the mounting position of the base 20 in the fore/aft direction of the vehicle by being connectable to attachment brackets 34 provided on the power transfer seat base 20 at multiple positions. The mounting system 30 also includes at least one, and preferably multiple (e.g., two) movable hooks 36 that accommodate variation in the mounting position of the base 20 in the lateral (e.g., right/left direction) by connecting the removable cross members 31 and/or the power transfer seat base 20 to the vehicle in a manner that allows for different side-to-side spacing. The mounting system 30 may further include at least one, and preferably multiple (e.g., two) movable forks 40 that cooperate with the movable hooks 36 to mount the power transfer seat base 20 to the vehicle in a manner that accommodates variation in the mounting position of the base 20 in the lateral direction.

In particular, the removable cross members 31 are connected to the power transfer seat base 20 at different locations in the fore/aft direction and the movable hooks 36 are attached to the power transfer seat base 20 and at least one of the removable cross members 31 at different locations in the lateral direction. The mounting system 30 includes the attachment brackets 34 disposed on the power transfer seat base 20. Each of the attachment brackets 34 is connected to a respective one of the removable cross members 31. According to one embodiment, two attachment brackets 34, one bracket 34 provided on each lateral side of the base 20, are provided for connection to each of the removable cross members 31 provided. Thus, in the embodiment illustrated in FIG. 5, the mounting system 30 is provided with two removable cross members 31 spaced apart in the fore/aft direction and four corresponding attachment brackets 34. Each of the attachment brackets 34 includes a plurality of adjustment holes 35 defined therein, which are spaced apart in the fore/aft direction. Each of the attachment brackets 34 is connected to the respective one of the removable cross members 31 by at least one fastener 33 engaging holes 32 formed in a portion of the respective removable cross member 31 and at least one of the plurality of adjustment holes 35 formed in the attachment bracket 34. In this manner, the position of the power transfer seat base 20 with respect to the removable cross members 31 in the fore/aft direction may be adjusted or configured by selecting which of the plurality of adjustment holes 35 of the attachment brackets 34 are to be engaged with fasteners 33 to connect the removable cross members 31 to the power transfer seat base 20.

At least one of the removable cross members 31 may include at least two sets of adjustment holes 39 defined therein at opposite lateral ends of the removable cross member 31, which extend through the removable cross member 31. The adjustment holes 39 of each set are spaced apart in the lateral direction. Each of the movable hooks 36 is connected to a respective one of the removable cross members 31 by at least one fastener 38 engaging the movable hook 36 and at least one of the adjustment holes 39 in the set of adjustment holes 39 in the respective end of the removable cross member 31. As shown in FIG. 8, the fastener 38 is a bolt that engages the movable hook 36, passes through the selected attachment hole 39 in the removable cross member 31, and then engages an attachment plate 37 that is slid over an end of the movable hook 36 to rigidly connect the movable hook 36 to the removable cross member 31. In this manner, the position of the removable cross members 31, and, thus, the power transfer seat base 20, in the lateral direction may be adjusted or configured by selecting which of the plurality of adjustment holes 39 of the removable cross member 31 are to be engaged with the bolts 38 to connect the removable cross member 31 to the movable hooks 36. As discussed above, the mounting system 30 may also include at least one and preferably multiple, e.g., two, movable forks 40 that are configured to be attached by fasteners 41 to a rear of the power transfer seat base 20 at different locations in the lateral direction.

It is to be appreciated that the movable hooks 36, movable forks 40, and/or the removable cross members 31 are connected, directly or indirectly, to existing mooring points built in the vehicle floor. Since different vehicles are likely to have different types and configurations of mooring points, prior art mounting systems for power transfer seats had to be individually configured for a variety of different vehicle configurations. The mounting system 30 of the present invention may avoid the necessity of providing differently configured mounting systems for a variety of vehicles by making the connections between the elements of the mounting system 30 and the power seat transfer base 20 adjustable and configurable. Alternatively, the mounting system 30 may include a vehicle specific installation kit.

With reference to FIGS. 5-8, according to one other preferred and non-limiting embodiment of the present invention, a method of assembling a power transfer seat base 20 is provided. The method includes providing a power transfer seat base 20 having a top fixed plate 21, at least one fixed stop 23 connected to an upper surface of the top fixed plate 21, a rotating plate 22, at least one rotating stop 24 connected to a bottom surface of the rotating plate 22, a user control interface box mounting bracket 25 configured to be mounted on the rotating plate 22, and a mounting system 30 for the power transfer seat base 20, which includes at least one removable cross member 31 and at least one movable hook 36. The method further includes selecting one of a right side configuration and a left side configuration for the power transfer seat base 20, attaching the at least one rotating stop 24 to a side of the bottom surface of the rotating plate 22 based on the selection of one of the right side configuration and the left side configuration, mounting the user control interface box mounting bracket 25 on a side of the rotating plate 22 based on the selection of one of the right side configuration and the left side configuration, rotatably mounting the rotating plate 22 to the top fixed plate 21, selecting a position of the power transfer seat base 20 and the at least one removable cross member 31 with respect to the at least one movable hook 36 in a lateral direction, attaching the at least one movable hook 36 to the power transfer seat base 20 and the at least one removable cross member 31 based on the selected position in the lateral direction, selecting a position of the power transfer seat base 20 with respect to the at least one removable cross member 31 in a fore/aft direction, and attaching the at least one removable cross member 31 to the power transfer seat base 20 based on the selected position in the fore/aft direction.

It is to be understood that the invention may assume various alternative variations and step sequences, except where expressly specified to the contrary. It is also to be understood that the specific devices and processes illustrated in the attached drawings, and described in the specification, are simply exemplary embodiments of the invention. Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope thereof. For example, it is to be understood that the present invention contemplates that, to the extent possible, one or more features of any embodiment can be combined with one or more features of any other embodiment.

The invention claimed is:

1. A power transfer seat base assembly, comprising:
   a power seat transfer base, comprising:
      a top fixed plate, the top fixed plate having at least one fixed stop attached to an upper surface of the top fixed plate;
      a rotating plate mounted on the top fixed plate, the rotating plate having at least one rotating stop attached to a bottom surface of the rotating plate;
      a user control interface box mounting bracket mounted on the rotating plate; and
      an operating control, the operating control comprising:
         a user control interface box body;
         at least one rotation control switch disposed on a first portion of the user control interface box body, the at least one rotation control switch configured to be actuated to control rotational movement of the power transfer seat about a vertical axis; and
         a directional control switch disposed on a second portion of the user control interface box body, the directional control switch configured to be actuated to control forward and rearward movement of the transfer seat base and upward and downward movement of the power transfer seat,
   wherein the user control interface box body is configurable for both driver and passenger side applications,
   wherein the rotating plate is rotatably mounted to the top fixed plate and configured so that the at least one rotating stop and the user control interface box mounting bracket may be connected to the rotating plate at different positions, and
   wherein the power seat transfer base assembly further comprises a mounting system for the power transfer seat base, the mounting system comprising:
      at least one removable cross member, the at least one removable cross member being configured to be attached to the power transfer seat base at different locations in a fore/aft direction; and
      at least one movable hook, the at least one movable hook configured to be attached to the power seat transfer base and the at least one removable cross member at different locations in a lateral direction.

2. The power transfer seat base assembly according to claim 1, wherein the at least one fixed stop attached to the upper surface of the top fixed plate comprises at least two fixed stops attached to opposing sides of the upper surface of the top fixed plate.

3. The power transfer seat base assembly according to claim 1, wherein the at least one fixed stop attached to the upper surface of the top fixed plate is configured to engage the at least one rotating stop attached to the bottom surface of the rotating plate to stop rotation of the rotating plate with respect to the top fixed plate in a direction of rotation.

4. The power transfer seat base assembly according to claim 1, wherein the at least one rotating stop and the user control interface box mounting bracket may be connected to the rotating plate on different sides of the rotating plate.

5. The power transfer seat base assembly according to claim 1, wherein the operating control is mounted on the user control interface box mounting bracket.

6. The power transfer seat base assembly according to claim 1, wherein the first portion of the user control interface box body comprises a forward half of the user control interface box body and the second portion of the user control interface box body comprises a rearward half of the user control interface box body.

7. The power transfer seat base assembly according to claim 1, wherein the at least one removable cross member comprises at least two removable cross members.

8. The power transfer seat base assembly according to claim 7, wherein the mounting system further comprises at least two attachment brackets disposed on the power transfer seat base,
   wherein each of the at least two attachment brackets is connected to a respective one of the at least two removable cross members,
   wherein each of the at least two attachment brackets includes a plurality of adjustment holes defined therein and spaced apart in the fore/aft direction, and
   wherein each of the at least two attachment brackets is connected to the respective one of the at least two removable cross members by at least one fastener engaging the respective one of the at least two removable cross members and at least one of the plurality of adjustment holes of the attachment bracket.

9. The power transfer seat base assembly according to claim 1, wherein the at least one movable hook comprises at least two movable hooks.

10. The power transfer seat base assembly according to claim 9, wherein the at least one removable cross member includes at least two sets of adjustment holes defined therein at opposite ends of the at least one removable cross member, wherein the adjustment holes of each set are spaced apart in the lateral direction, and
   wherein each of the at least two movable hooks is connected to the at least one removable cross member by at least one fastener engaging the movable hook and at least one of the adjustment holes of the set of adjustment holes in the respective end of the at least one removable cross member.

11. The power transfer seat base assembly according to claim 1, wherein the mounting system further comprises at least one movable fork configured to be attached to a rear of the power transfer seat base at different locations in the lateral direction.

12. A method of assembling a power transfer seat base, comprising:
   providing a power transfer seat base, comprising:
      a top fixed plate;
      at least one fixed stop connected to an upper surface of the top fixed plate;
      a rotating plate;
      at least one rotating stop configured to be attached to a bottom surface of the rotating plate; and
      a user control interface box mounting bracket configured to be mounted on the rotating plate;
   providing a mounting system for the power transfer seat base, the mounting system comprising at least one removable cross member and at least one movable hook;
   selecting one of a right side configuration and a left side configuration for the power transfer seat base;

attaching the at least one rotating stop to a side of the bottom surface of the rotating plate based on the selection of one of the right side configuration and the left side configuration;

mounting the user control interface box mounting bracket on a side of the rotating plate based on the selection of one of the right side configuration and the left side configuration;

rotatably mounting the rotating plate to the top fixed plate;

selecting a position of the power transfer seat base and the at least one removable cross member with respect to the at least one movable hook in a lateral direction;

attaching the at least one movable hook to the power transfer seat base and the at least one removable cross member based on the selected position in the lateral direction;

selecting a position of the power transfer seat base with respect to the at least one removable cross member in a fore/aft direction; and attaching the at least one removable cross member to the power transfer seat base based on the selected position in the fore/aft direction.

13. A power transfer seat base assembly, comprising:
a power transfer seat base, comprising:
- a top fixed plate, the top fixed plate having at least one fixed stop attached to an upper surface of the top fixed plate;
- a rotating plate mounted on the top fixed plate, the rotating plate having at least one rotating stop attached to a bottom surface of the rotating plate; and
- a user control interface box mounting bracket mounted on the rotating plate; and a mounting system for the power transfer seat base, the mounting system comprising:
- at least one removable cross member, the at least one removable cross member being configured to be attached to the power transfer seat base at different locations in a fore/aft direction; and
- at least one movable hook, the at least one movable hook configured to be attached to the power transfer seat base and the at least one removable cross member at different locations in a lateral direction, wherein the rotating plate is rotatably mounted to the top fixed plate and configured so that the at least one rotating stop and the user control interface box mounting bracket may be connected to the rotating plate at different positions.

14. The power transfer seat base assembly according to claim 13, wherein the at least one fixed stop attached to the upper surface of the top fixed plate comprises at least two fixed stops attached to opposing sides of the upper surface of the top fixed plate.

15. The power transfer seat base assembly according to claim 13, wherein the at least one fixed stop attached to the upper surface of the top fixed plate is configured to engage the at least one rotating stop attached to the bottom surface of the rotating plate to stop rotation of the rotating plate with respect to the top fixed plate in a direction of rotation.

16. The power transfer seat base assembly according to claim 13, wherein the at least one rotating stop and the user control interface box mounting bracket may be connected to the rotating plate on different sides of the rotating plate.

17. The power transfer seat base assembly according to claim 13, further comprising an operating control.

18. The power transfer seat base assembly according to claim 17, wherein the operating control is mounted on the user control interface box mounting bracket.

19. The power transfer seat base assembly according to claim 13, wherein the at least one removable cross member comprises at least two removable cross members.

20. The power transfer seat base assembly according to claim 19, wherein the mounting system further comprises at least two attachment brackets disposed on the power transfer seat base,
- wherein each of the at least two attachment brackets is connected to a respective one of the at least two removable cross members,
- wherein each of the at least two attachment brackets includes a plurality of adjustment holes defined therein and spaced apart in the fore/aft direction, and
- wherein each of the at least two attachment brackets is connected to the respective one of the at least two removable cross members by at least one fastener engaging the respective one of the at least two removable cross members and at least one of the plurality of adjustment holes of the attachment bracket.

21. The power transfer seat base assembly according to claim 13, wherein the at least one movable hook comprises at least two movable hooks.

22. The power transfer seat base assembly according to claim 21, wherein the at least one removable cross member includes at least two sets of adjustment holes defined therein at opposite ends of the at least one removable cross member, wherein the adjustment holes of each set are spaced apart in the lateral direction, and
- wherein each of the at least two movable hooks is connected to the at least one removable cross member by at least one fastener engaging the movable hook and at least one of the adjustment holes of the set of adjustment holes in the respective end of the at least one removable cross member.

23. The power transfer seat base assembly according to claim 13, wherein the mounting assembly further comprises at least one movable fork configured to be attached to a rear of the power transfer seat base at different locations in the lateral direction.

* * * * *